UNITED STATES PATENT OFFICE.

SAMUEL HENRY FLEMING, OF CAMDEN, NEW JERSEY, ASSIGNOR TO E. I. DU PONT DE NEMOURS POWDER COMPANY, OF WILMINGTON, DELAWARE, A CORPORATION OF NEW JERSEY.

METHOD OF TREATING GLYCERIN.

969,159.  Specification of Letters Patent.  Patented Sept. 6, 1910.

No Drawing.  Application filed May 27, 1909.  Serial No. 498,749. REISSUED

*To all whom it may concern:*

Be it known that I, SAMUEL HENRY FLEMING, a citizen of the United States, residing at Camden, county of Camden, and State of New Jersey, have invented a new and useful Improvement in Methods of Treating Glycerin and Products Produced Thereby, of which the following is a full, clear, and exact description.

Polymerized glycerin or poly-glycerin is a term used for a glycerin in which, as is generally supposed, two or more of the glycerin molecules are combined together. There are several ways in which this is produced at the present time; thus it has been produced by heating alone, which is very slow and not effective and produces a product which is quite impure. In order to accelerate the reaction, certain alkalies have been used, among which caustic soda, NAOH, is the most prominent. The use of caustic soda, while it accelerates the reaction, has a tendency to produce by-products, which are deleterious to the glycerin. I have carried on a line of work with respect to this so-called polymerized glycerin or poly-glycerin and I am led to believe that there is not only a union of the molecules of the glycerin but also that a certain proportion of the water of the combining molecules is driven off, thus producing a condensation product of glycerin.

The glycerin treated as before described has certain advantages in that it may be used in the manufacture of nitro-glycerin compounds for explosives which will have a lower freezing point than where nitro-glycerin made from glycerin not so treated is used. I am also led to believe, from many tests, that nitro-glycerin made from glycerin so treated is less liable to decompose than is nitro-glycerin made from glycerin not so treated. In working on this line I have discovered that if instead of using an alkali, I use an acetate which may be any of the acetates, preferably sodium acetate, $NaC_2H_3O_2$, but otherwise treated as before described, the product will be produced with much less decomposition of the glycerin than occurs where alkalies are used. Preferably I add the acetate in quantity of one-half to one per cent. of the weight of the glycerin. This mixture is subjected to a temperature of 275° to 280° centigrade. The water which separates in the reaction is distilled off, leaving a mixture of this glycerin, which is generally known as polymerized glycerin or poly-glycerin, and sodium acetate in which about seventy per cent. of the glycerin is so-called polymerized.

The detailed statement of the process and the *rationale* of the same are as follows: The glycerin used is what is known as dynamite glycerin, which is a highly purified glycerin containing 98 to 99% glycerin. The reaction according to which glycerin is condensed to diglycerin is as follows:

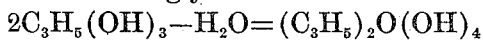

or—

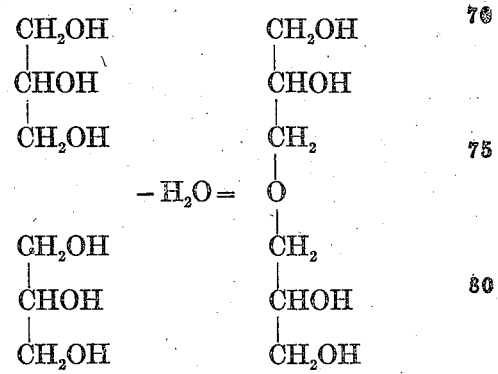

Triglycerin is formed as follows:

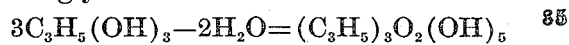

or—

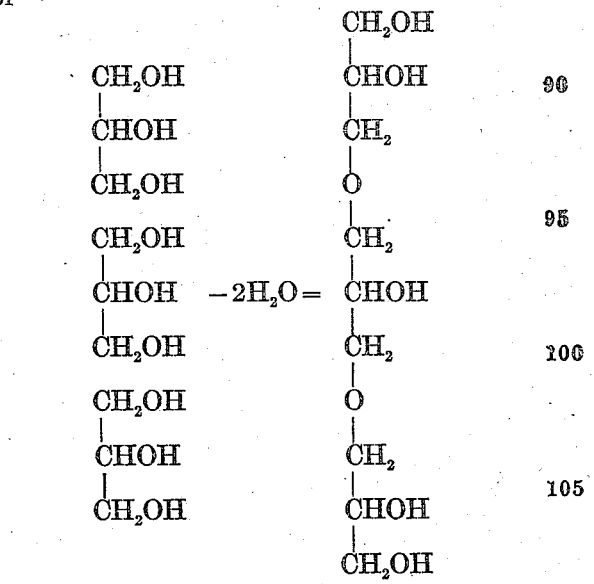

In the same way tetra, penta, hexa, etc., glycerin would be formed by the elimination of 3, 4, 5, etc., molecules of water respectively.

All these products are conveniently and concisely grouped under the common term "polyglycerins." The strictly correct chemical name would be condensed glycerin. For all known purposes either of these terms is amply adequate. The term "condensation" as here used will be found defined on page 578 of "*Arbeitsmethoden für Organisch-Chemische Laboratorien*," Lassar-Cohn, 3rd edition, 1903. As a matter of fact, when glycerin is polymerized by the method at present known, practically all of that converted goes to the form of diglycerin and only a small percentage to triglycerin. Probably no more than traces pass into tetraglycerin, and the higher products, if, in fact, any at all suffers this change.

Adherence to the following directions will enable any one to carry out my process: A suitable vessel of glass, metal or other material which will stand the working temperature is selected, with an outlet sufficient in size to permit of the ready exit of the water vapors formed, and the small amount of glycerin which accompanies them. This glycerin is of a quality suitable for the manufacture of ordinary nitroglycerin. The glycerin is weighed and from this weight, the proper amount of anhydrous sodium acetate is computed and added, although it is possible to obtain results with the crystallized salt. Of course, it is immaterial whether mixture of glycerin and sodium acetate is effected in or outside of the heating vessel. The contents of the vessel are now raised to a boiling temperature, which increases a little as the reaction progresses, the average being in the neighborhood of 280° C. The heating is continued for a suitable length of time. After about an hour, the product will contain about 70% of polymerized glycerin if 1% sodium acetate has been used.

Having now fully described my invention, what I claim and desire to protect by Letters Patent is:—

1. The hereinbefore described method of treating glycerin, which consists in mixing with the glycerin an acetate and subjecting the mixture to heat.

2. The hereinbefore described method of treating glycerin, which consists in mixing with the glycerin an acetate, and subjecting the mixture to heat, the acetate being in quantity from one-half to one per cent. of the weight of the glycerin.

3. The hereinbefore described method of treating glycerin, which consists in mixing with the glycerin sodium acetate, and subjecting the mixture to heat.

4. The hereinbefore described method of treating glycerin, which consists in mixing with the glycerin sodium acetate, and subjecting the mixture to heat, the sodium acetate being in quantity from one-half to one per cent. of the weight of the glycerin.

In testimony of which invention, I have hereunto set my hand, at Camden, on this 21st day of May, 1909.

SAMUEL HENRY FLEMING.

Witnesses:
August Seeman,
F. B. Holmes.